(12) United States Patent
Sanchez et al.

(10) Patent No.: US 9,386,081 B2
(45) Date of Patent: Jul. 5, 2016

(54) SCALABLE CONTENT DISTRIBUTION FOR SPARSE PUBLISH-SUBSCRIBE SYSTEMS USING THE OBJECT MANAGEMENT GROUP REAL-TIME PUBLISH-SUBSCRIBE PROTOCOL

(71) Applicant: Real-Time Innovations, Inc., Sunnyvale, CA (US)

(72) Inventors: Fernando Crespo Sanchez, Bedford, NH (US); Jan Van Bruaene, San Jose, CA (US); Tron Sjur Kindseth, San Francisco, CA (US); Gerardo Pardo-Castellote, Santa Cruz, CA (US); Roshan Krishnan, San Jose, CA (US); Rajive Joshi, San Jose, CA (US)

(73) Assignee: Real-Time Innovations, Inc., Sunnyvale, CA (US)

( * ) Notice: Subject to any disclaimer, the term of this patent is extended or adjusted under 35 U.S.C. 154(b) by 155 days.

(21) Appl. No.: 14/473,705

(22) Filed: Aug. 29, 2014

(65) Prior Publication Data
US 2015/0067059 A1 Mar. 5, 2015

Related U.S. Application Data

(60) Provisional application No. 61/872,441, filed on Aug. 30, 2013.

(51) Int. Cl.
| | | |
|---|---|---|
| *G06F 15/16* | (2006.01) | |
| *H04L 29/08* | (2006.01) | |
| *H04L 12/58* | (2006.01) | |
| *G06F 17/30* | (2006.01) | |
| *H04L 12/24* | (2006.01) | |

(52) U.S. Cl.
CPC ............... *H04L 67/10* (2013.01); *G06F 17/30* (2013.01); *H04L 41/00* (2013.01); *H04L 51/14* (2013.01)

(58) Field of Classification Search
USPC ............... 709/204, 201, 202, 203, 230, 231
See application file for complete search history.

*Primary Examiner* — Lan-Dai T Truong
(74) *Attorney, Agent, or Firm* — Lumen Patent Firm

(57) ABSTRACT

Publisher-side content based filtering methods and systems are provided to select which subscribers shall receive each data-message sent by a publisher using an Object Management Group (OMG) Real-Time Publish-Subscribe (RTPS) protocol. Methods and systems are provided for writer-side content based filtering and data distribution from a publisher to a plurality of subscribers using an Object Management Group (OMG) Real-Time Publish-Subscribe (RTPS) protocol. Methods and systems are provided for performing scalable content-based filtering and distribution from a publisher to a plurality of subscribers using the Object Management Group (OMG) Real-Time Publish-Subscribe (RTPS) protocol.

3 Claims, 13 Drawing Sheets

SCALABLE CONTENT DISTRIBUTION FOR SPARSE PUBLISH-SUBSCRIBE SYSTEMS USING THE OBJECT MANAGEMENT GROUP REAL-TIME PUBLISH-SUBSCRIBE PROTOCOL

CROSS-REFERENCE TO RELATED APPLICATIONS

This application claims priority from U.S. Provisional Patent Application 61/872,441 filed Aug. 30, 2013, which is incorporated herein by reference.

FIELD OF THE INVENTION

This invention relates generally to data and message distribution in distributed computer systems. In particular, the invention relates to the distribution of data and messages based on the message contents from a message publisher to many subscribers, and more specifically in situations with large numbers of subscribers where only a few subscribers are interested on each particular message.

BACKGROUND OF THE INVENTION

Many distributed systems require a publish-subscribe data exchange in where applications publish data samples, which become available to remote applications interested on them. In sparse publish-subscribe systems, the subscriber applications subscribe only to a subset of the data published in the system. As the number of subscribers increases it is important to optimize bandwidth usage as well as CPU and memory consumption in order to scale.

The Object Management Group (OMG) Real-Time Publish-Subscribe Protocol (RTPS) has become one of the most relevant wire protocols for publish-subscribe communications. RTPS is the wire protocol for Data Distribution Service (DDS), a specification of a publish-subscribe middleware created in response to the need to standardize a data-centric publish-subscribe programming model for distributed systems. The increasing number of systems using DDS and RTPS for publish-subscribe make necessary addressing the scalability problem derived from adding more subscribers to an RTPS systems.

The present invention addresses the problem of scaling the data exchange and filtering operations in sparse publish-subscribe systems using RTPS.

SUMMARY OF THE INVENTION

The Object Management Group (OMG) Data Distribution Service (DDS) is a Standard for high performance data-centric publish-subscribe communication. DDS is organized around the distributing data in a global data space across nodes on a network. On DDS systems applications use DDS Publisher and (Data)Writer objects to send messages on a Topic name which are received by other applications that have DDS Subscriber and (Data)Reader objects that have specified their interest on that same Topic name.

Applications using DDS may be distributed on different processes and may also be on different computers connected via a network. In this situation the Publishers and Subscribers communicate using a standard network Wire Protocol, the "OMG Real-Time Publish-Subscribe (RTPS) Protocol DDS Interoperability Wire Protocol." RTPS sends messages over a lower-level transport network protocol such as TCP/IP or UDP/IP. The RTPS protocol supports direct sending of messages from Publishers to Subscribers without intermediate brokers or relays so the resulting DDS Applications can communicate in a peer-to-peer fashion.

On a DDS system a Subscriber can further specify its interest on a subset of the messages sent to a Topic by providing a Content-Filter. The Content-Filter is an expression involving the data inside the message whose evaluation determines whether a particular message is of interest to that Subscriber. For example, if the messages communicate current values of stocks and have fields that represent the stock ticker name and the current ask price. A Subscriber can use an expression such as "symbol='IBM' && ask <=30" to indicate it is interested only on messages related to the 'IBM' ticker where the asking price is less or equal to thirty.

There are situations where a single DDS Publisher is sending data using the RTPS protocol to many DDS Subscribers on the same Topic name where many of these subscribers have specified Content Filters. In this scenario each individual message may be of interest to a very small proportion of the subscribers. These situations or systems are referred to as "sparse" content-based publish-subscribe systems.

Sparse content-based publish-subscribe systems often result in scalability and performance problems to the Publisher, the Subscribers, and the network infrastructure: If the Publisher sends each message to every Subscriber such that the messages are filtered on the "reader-side" to determine if they are of interest, then the network is burdened with too many messages and Subscribers receive many messages that are not of interest to them. Alternatively if the Publisher evaluates each message to determine which subset of subscribers is interested in it (i.e. does "writer-side" filtering), then it may spend too much time in the evaluation of the filter reducing the rate at which messages can be sent. Even when a Publisher does writer-side filtering and determines that a specific Subscriber is not interested in a message the RTPS protocol states certain meta-data messages should be sent to the Subscriber to let it know that messages were not sent to it. These RTPS meta-data messages can also severely impact the scalability and network use of the system.

The present invention provides in one embodiment a method for performing publisher-side content based filtering to select which subscribers shall receive each data-message sent by a publisher using an Object Management Group (OMG) Real-Time Publish-Subscribe (RTPS) protocol. This method includes the following computer-implemented method steps executable by one or more computers in a networked system. A publisher and a plurality of subscribers are able to communicate with each other using the RTPS protocol. Each of the subscribers uses a content filter to subscribe to a subset of the information published by the publisher. The publishes is being informed about the content filter used by each of the subscribers. The publisher determines via a lookup table (e.g. hash table) the set of subscribers for which a data-message passes the corresponding subscriber content filter and then sending the data-message. The publisher then evaluates the content filter of each of the subscribers on the data-message if the lookup table does not contain the set of subscribers to which the data-messages shall be sent. The publisher updates the lookup table based on the result of the evaluation of the content-filter of each of the subscribers for a particular data-message.

In some specific examples of this embodiment the subscriber content filters involve only a subset of fields of the data-message. Furthermore, the subscriber content filters involve only the fields marked as key attributes for the associated data-type. In addition, the lookup table could store only the subset of the fields of the data-message involved in the subscriber filters.

In another embodiment, the present invention provides a method for performing writer-side content based filtering and data distribution from a publisher to a plurality of subscribers using an Object Management Group (OMG) Real-Time Publish-Subscribe (RTPS) protocol. This method includes the following computer-implemented method steps executable by one or more computers in a networked system. A publisher and a plurality of subscribers are able to communicate with each other using the RTPS protocol. Each of the subscribers uses a content filter to subscribe to a subset of the information published by the publisher. The subscribers are reachable in one or more locators defined as a transport kind, a transport address, or a transport port combination. The publisher delays the sending of an RTPS GAP message to the defined subscriber's locator until there is an RTPS DATA message with data that passes the subscriber's content filter. The publisher prepends the RTPS GAP message to the RTPS DATA message that is being sent to the subscriber locator. The RTPS GAP message contain a sequence number interval starting in a sequence number of the last RTPS DATA message previously sent to the subscriber's locator and ending in a sequence number one less than the sequence number of the RTPS DATA message that is also being sent to the Subscriber's locator, following the RTPS GAP. Some of the steps are iterated over all the defined locators on each of the subscribers with whom the publisher is communicating. The publisher sends HEARTBEAT messages to a subscriber only when the subscriber is missing DATA messages that pass the subscriber's content-filter. The publisher sends HEARTBEAT messages to a subscriber where the last sequence number in the HEARTBEAT is equal to the sequence number of the last DATA message that passed the subscriber's content-filter.

In some specific examples of this embodiment the reachable locators are a TCP/IP or UDP/IP based transport. In another example, the reachable locators are based on a shared-memory based transport.

In yet another embodiment, the present invention provides a method for performing scalable content-based filtering and distribution from a publisher to a plurality of subscribers using the Object Management Group (OMG) Real-Time Publish-Subscribe (RTPS) protocol. This method comprising the following computer-implemented method steps executable by one or more computers in a networked system. A publisher determines which of the subscribers shall receive a data-message by using a lookup table. The publisher delays sending an RTPS GAP message to a subscriber's locator until there is an RTPS DATA message with data that passes a subscriber's content filter.

DETAILED DESCRIPTION

Figure 1:
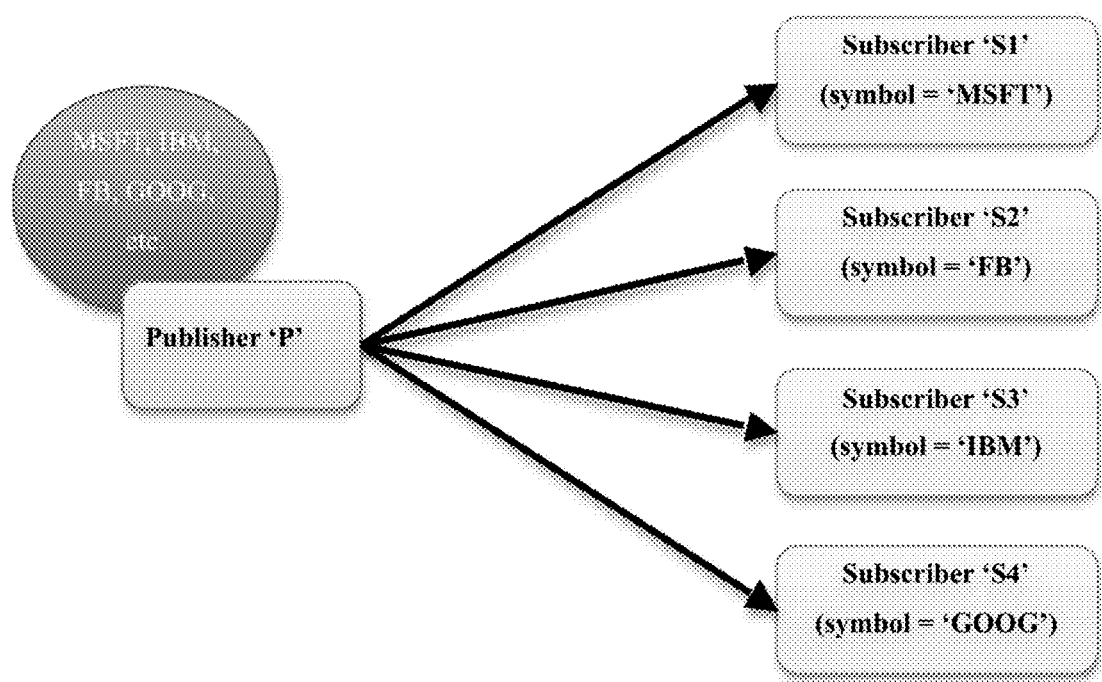
FIG. 1 shows an example of a sparse publish-subscribe system according to the prior art. The figure provides background information on a typical DDS system when a DDS Publisher may be sending data to many DDS Subscribers, each subscriber having a different filter that expresses is only interests in a subset of the messages. For example the first subscriber 'S1' is only interested in messages for the symbol 'MSFT'.
Figure 2:
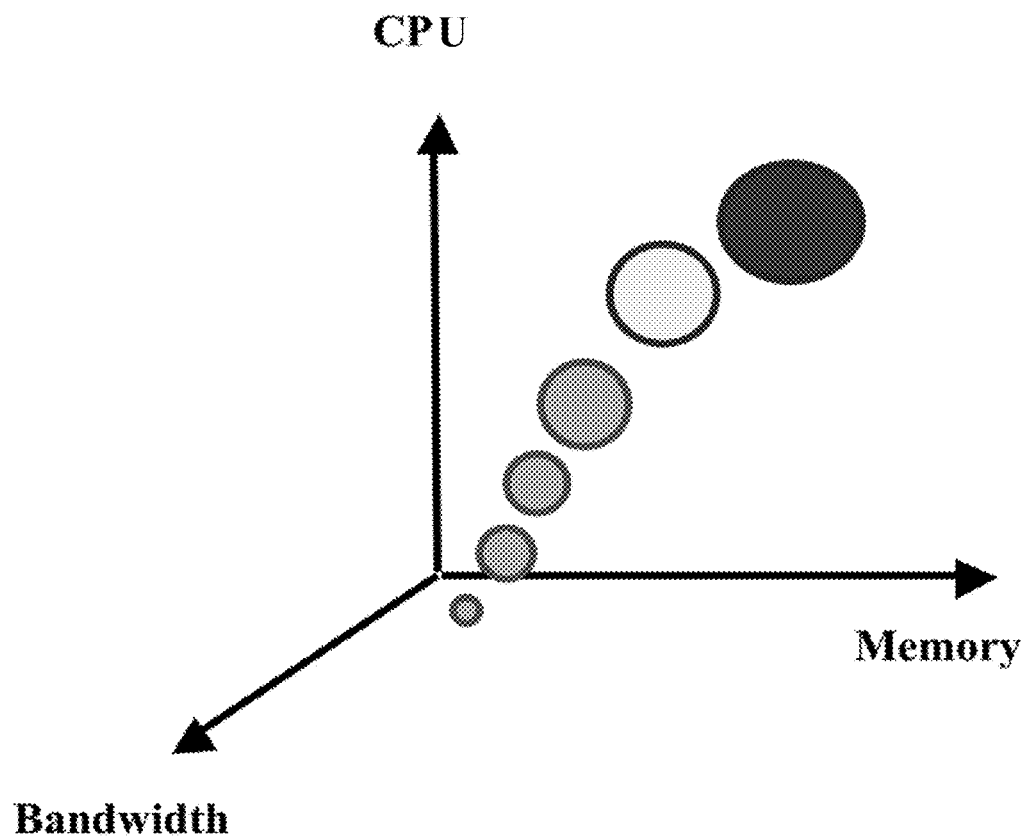
FIG. 2 shows an example of system scalability dimensions of FIG. 1 according to the prior art. This figure illustrates the scalability problem: as the number of Subscribers increases (size of the circle) so does CPU, memory, and bandwidth consumed by the system.
Figure 3:
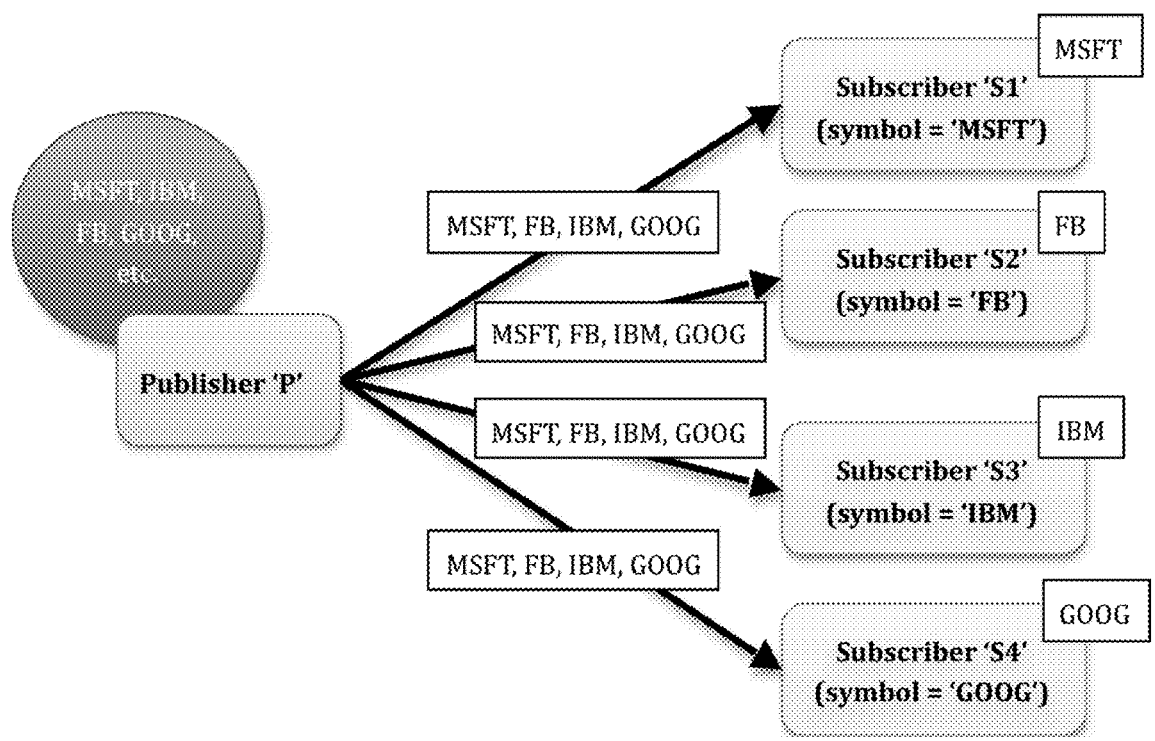
FIG. 3 shows an example of reader side filtering in relation to FIGS. 1-2 and according to the prior art. This figure illustrates the approach of sending each message to all subscribers and performing the operation at the subscriber side (reader-side).

In sparse content-based Publish-Subscribe systems, Subscribers subscribe to a subset of the information published by the Publishers (FIG. 1) where the subset is determined by a content filter on the data or message being sent. The scalability of the system described in FIG. 1 is determined by the increase in bandwidth, CPU, and memory utilization as we add new Subscribers (FIG. 2). If the burden of filtering fell on the Subscribers and the Publishers published all the available information to the different Subscribers, the usage of bandwidth and CPU would become prohibitive as the system size increases (FIG. 3).

Figure 4:
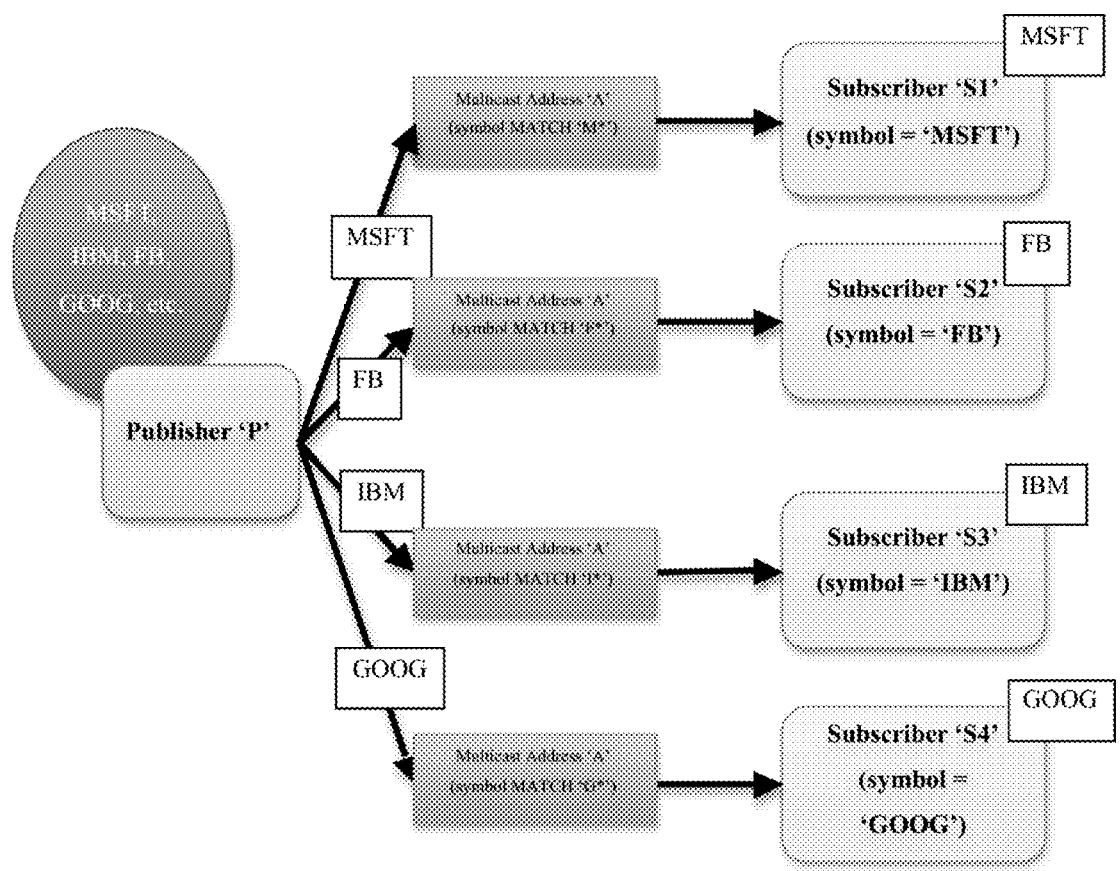
FIG. 4 shows an example of multicast filtering according to the prior art. This figure illustrates the concept of using multicast to have the "network infrastructure" perform some of the filtering.

One way to reduce resource consumption (bandwidth and CPU) is to publish the information over multicast (FIG. 4). The system administrator could group the information published into different multicast groups discriminating based on content and the Subscribers could subscribe to the subset of multicast groups that are of interest based on their content filter expressions.

The multicast solution described above has two main problems:
Multicast may not be available in the underlying transport; and
Creating a good a priori partition of the data into different multicast groups may not be feasible because the system administrator may not know the subscription patterns at run-time.

Figure 5:
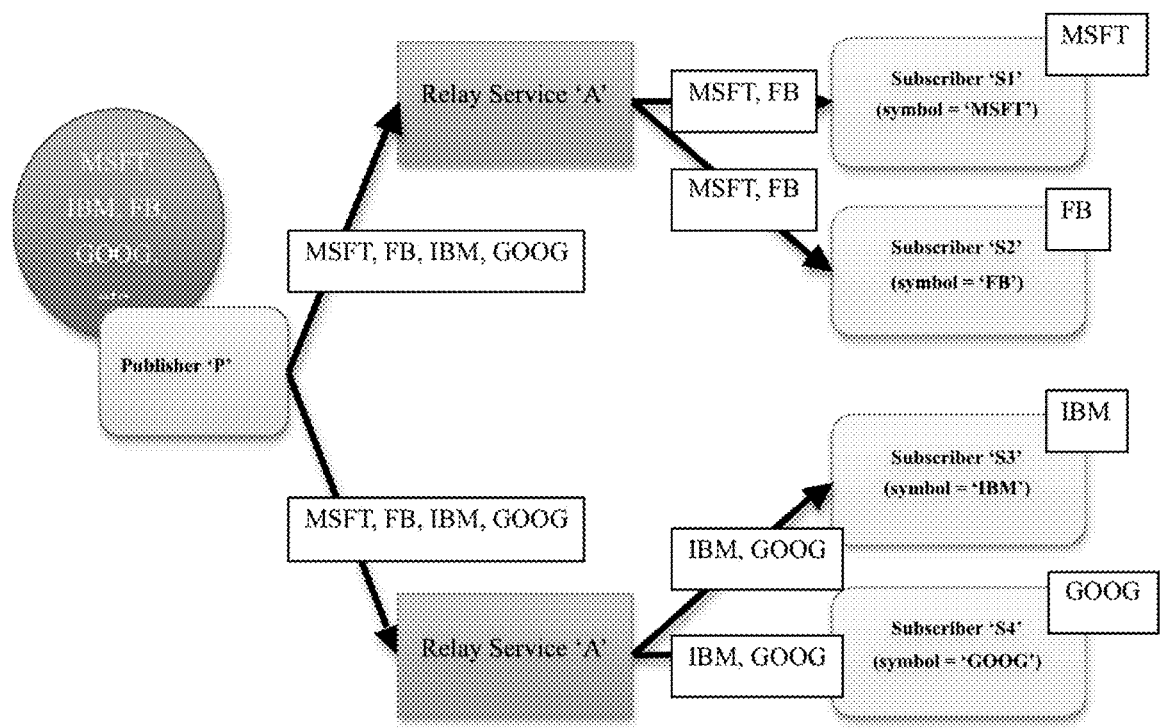
FIG. 5 shows an example of relay filtering according to the prior art. This figure illustrates the concept of having relays or proxies located between the Publisher and Subscribers doing the filtering.

Another way to reduce resource consumption (bandwidth, CPU, and memory) is based on creating a hierarchical network of Relay Services where each Relay subscribes to information on behalf of other Relays or Subscribers on a lower level in the hierarchy (FIG. 5).

The relay approach is independent of the underlying transport. However, it introduces additional services that need to be deployed as well as a latency penalty in the communications that may not be acceptable in certain systems.

Figure 6:
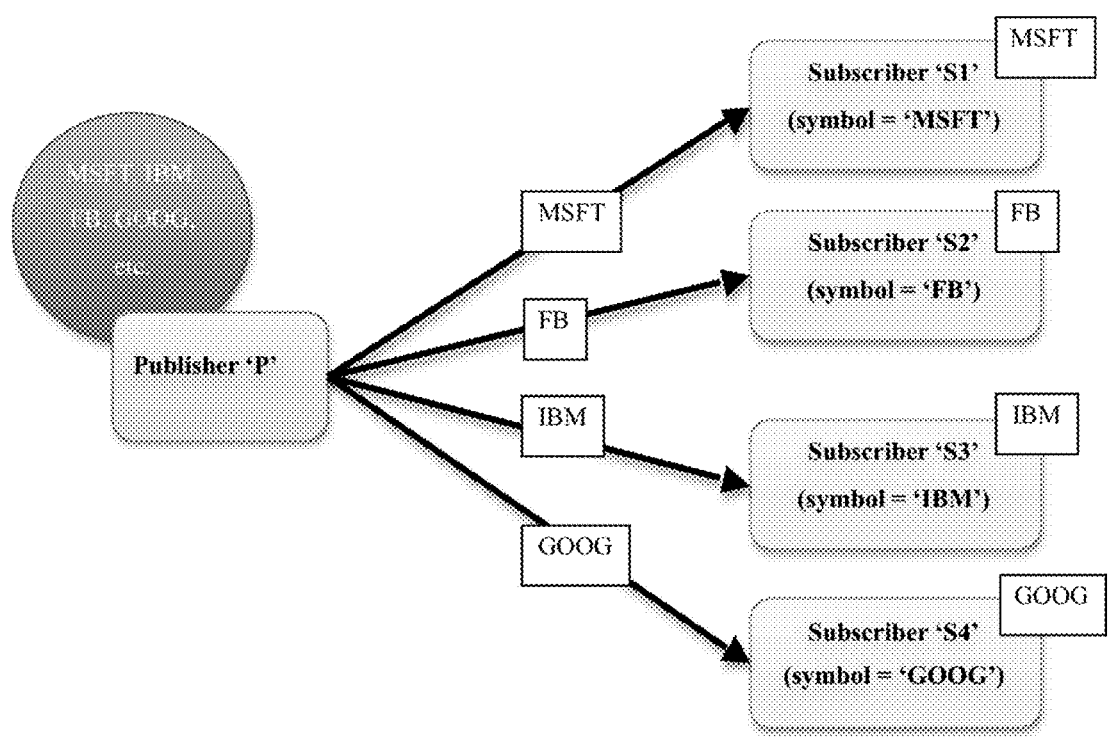
FIG. 6 shows an example of writer-side filtering according to the prior art. This figure shows concept of the Publisher doing the filtering (i.e. writer-side filtering) and sending to each subscribers only the messages that are of interest to that Subscriber.

Yet another way to reduce resource consumption (bandwidth and CPU on the Subscriber side) is to do writer-side filtering. With this approach, the Publisher filters the information on behalf of the Subscribers and it does not send a sample to a Subscriber unless it passes the Subscriber's filter expression FIG. 6).

The main problem with a writer-side filtering approach is that the CPU and memory utilization on the Publisher may not scale as we increase the number of Subscribers.

In the most basic implementation of a writer-side filtering approach, the Publisher keeps a communication session per Subscriber. Each session is used to deliver data to the associated Subscriber. Messages within a session are assigned a sequence number. The sequence number is used to guarantee ordered delivery of messages in reliable sessions and to detect message losses in best-effort sessions. When a new message is published, the Publisher evaluates the message against each one of the filter expressions of the matching Subscribers. If a message passes a Subscriber's filter it is added to the corresponding session.

In the best case, the algorithm described above has an order of complexity O(N) where N is the number of matching Subscribers. In addition, it requires keeping a communication session per Subscriber what it affects memory consumption as the system size increases.

The Object Management Group (OMG) Real-time Publish-Subscribe Wire Protocol (RTPS) has been designed for Publish-Subscribe communication model and it provides a way to share a single communication session across multiple Subscribers. Because the session is shared, when the Publisher filters a sample for a Subscriber it must be able to indicate that the sequence number associated with that sample is not relevant to that Subscriber.

Figure 7:
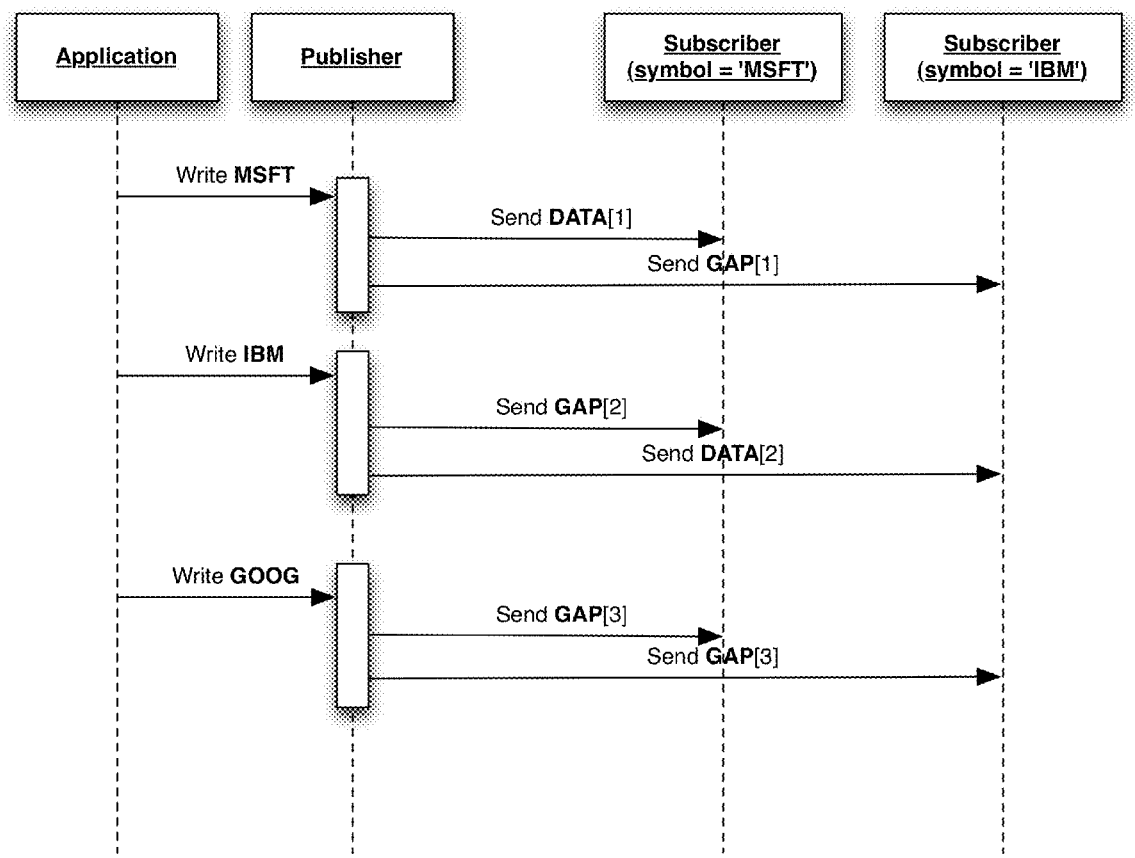
FIG. 7 shows an example of Real-time Publish-Subscribe Wire Protocol (RTPS) GAP messages according to the prior art. An RTPS GAP message is a special kind of meta-data message sent from a Publisher to a Subscriber indicating that there is a range of messages that will not be sent to the Subscriber because they are not of interest to it; for example messages they did not pass the content filter specified by the Subscriber. The RTPS GAP message contains a reduced set of information, such as the range of sequence numbers of the messages that were not sent to the Subscriber. Given that the subscriber does not receive the messages filtered in the writer side the messages it does receive may contain "holes" or "gaps" in their sequence numbers. The RTPS GAP message allows the Subscriber to recognize that these missing sequence numbers are expected rather than mis-interpreting them as message loss.

In RTPS, the way to indicate that specific sequence numbers are not relevant to a Subscriber (because of writer-side filtering, for example) is by using the so-called RTPS GAP message. See FIG. 7). The RTPS GAP message is designed such that it can contain information about a set of sequence numbers.

Sending GAP messages requires bandwidth usage and CPU cycles on the Publisher and Subscriber side. An efficient RTPS writer-side filtering implementation must be able to coalesce multiple sequence numbers within a single GAP message if possible.

The next sections describe a scalable way to do writer-side filtering in RTPS Publish-Subscribe reliable communications. The method of this invention reduces the CPU consumption per message on the Publisher from O(N) where N is the number of matching Subscribers to O(M) where M is the number of destinations (locators) corresponding to Subscribers that must receive the message (i.e. for which the message passes the content filter). It is noted that the following sections assume a basic understanding of RTPS. The reader is referred to http://www.omg.org/spec/DDSI-RTPS if such understanding is sought or desired.

Scalable Writer-Side Filtering

A scalable writer-side filtering implementation requires making the bandwidth utilization and the CPU usage on the Publisher as independent as possible from the number of matching Subscribers. This is especially relevant in sparse Publish-Subscribe systems where each Subscriber subscribes only to a subset of the information published by the Publishers publishing on the same DDS Topic name, specifically when the interest is expressed in terms of content filters applied to the data or message itself.

Bandwidth Usage Optimization

Lazy Gapping

Figure 8:
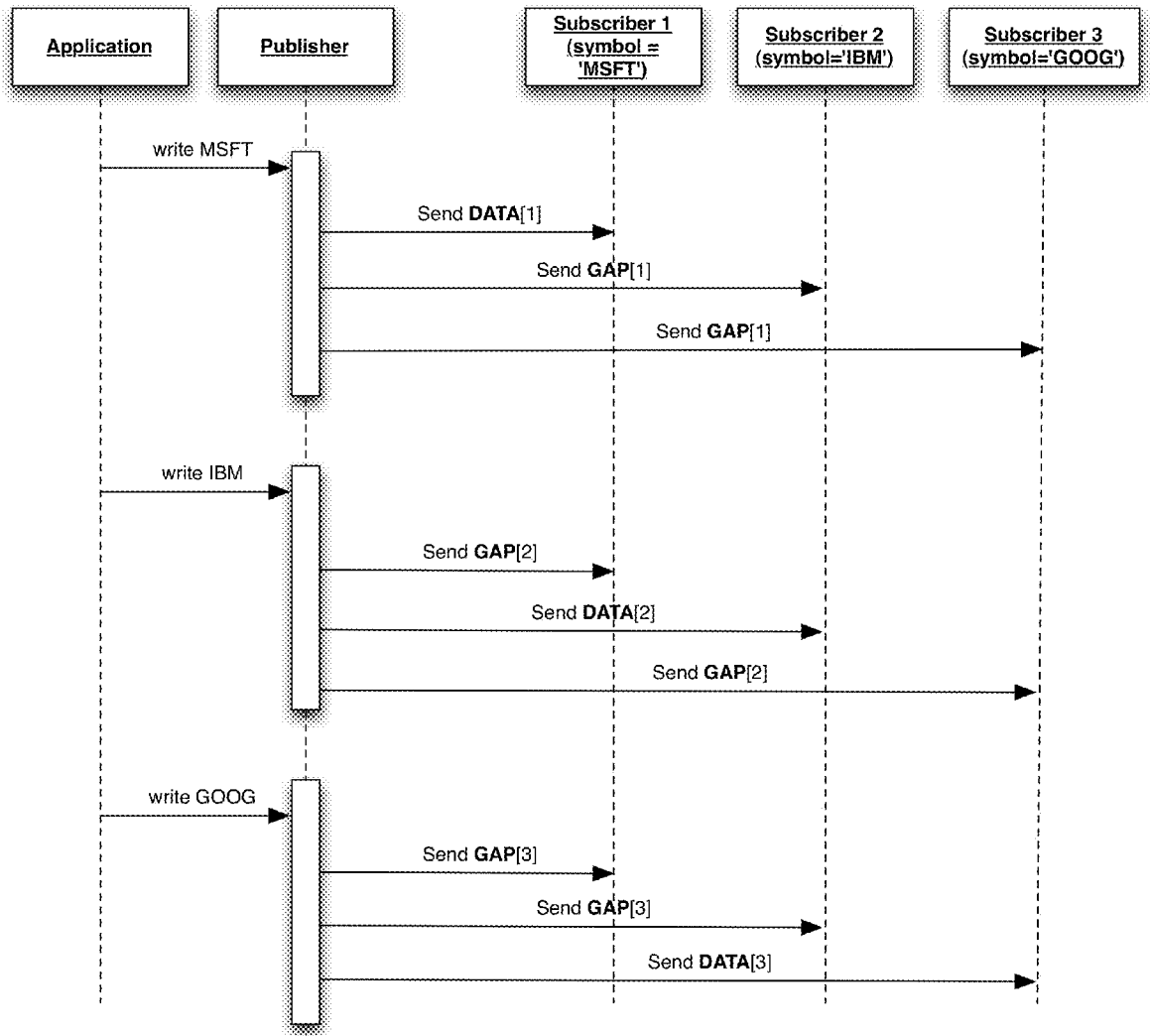
FIG. 8 shows an example of GAP message exchange according to the prior art. This figure illustrates GAP are sent to subscribers that are not interested in a message at the same time the message is sent to the other subscribers that are interested in it.

In RTPS Publish-Subscribe systems, the bandwidth usage is largely affected by how GAP messages are managed. A straightforward implementation for pushed data is to send DATA messages or GAP messages to each one of the Subscribers depending on whether or not the samples are filtered out on the Publisher side (writer-side) (FIG. 8).

The main problem with the approach described above is the excessive bandwidth usage. A Subscriber always receives RTPS messages (DATA or GAP) even if none of the published samples are of interest. A second problem is a high CPU usage on the Subscriber to process the GAP traffic.

The approach in this invention improves the bandwidth usage by not sending RTPS GAP messages to a Subscriber unless they are strictly needed so that (a) the otherwise separate GAP messages can be combined into fewer GAP messages and (b) they can also be combined with other messages destined to the same Subscriber.

Figure 9:
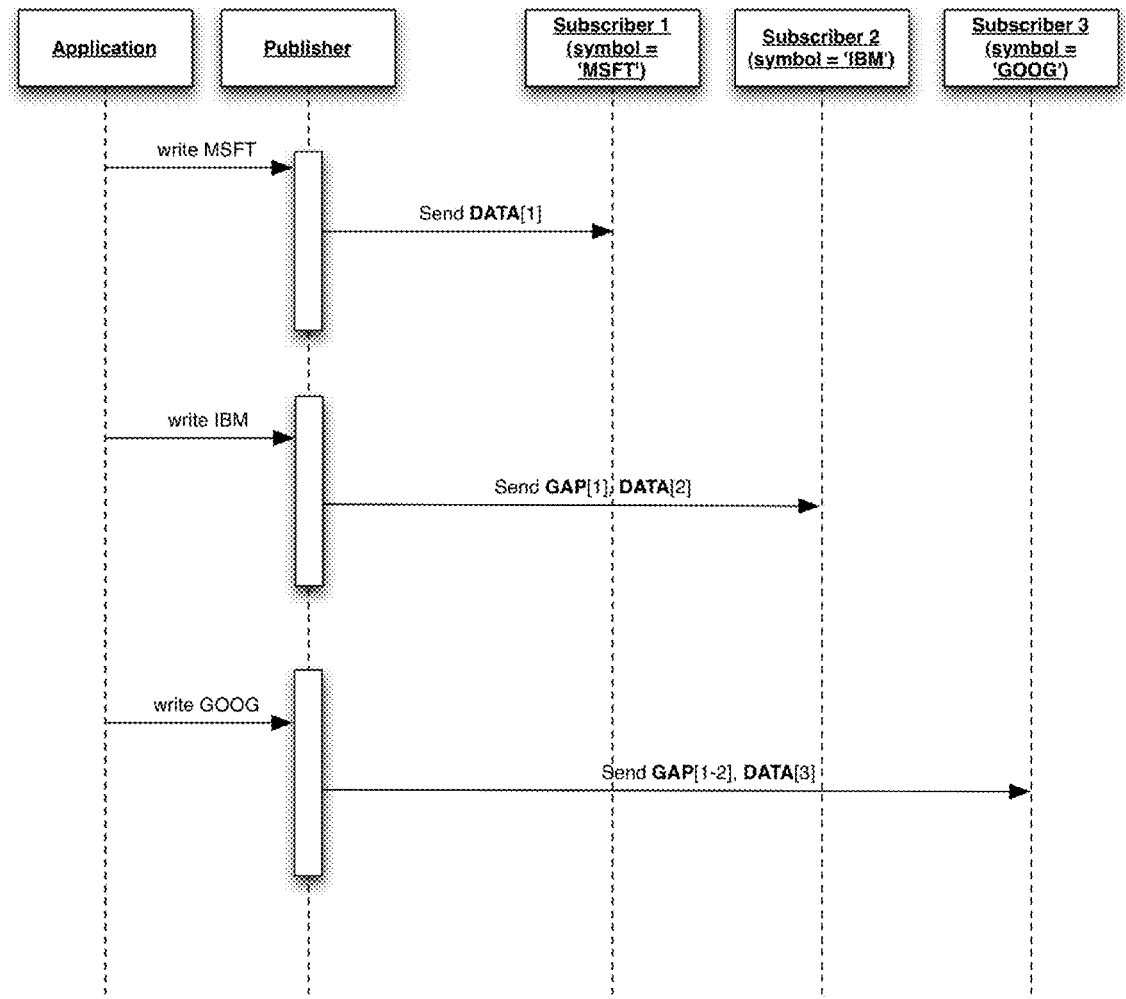
FIG. 9 shows an example of lazy GAP management according to an embodiment of the present invention.

In an RTPS session, GAP messages are only needed when a Subscriber receives a sequence number 'X' and some of the previous sequence numbers between the last sequence number received and 'X' have been filtered out. Sending the GAP messages lazily according to the previous rule reduces the bandwidth utilization significantly (FIG. 9). It is noted that the GAP message sent to Subscriber 3 contains information about sequence numbers 1 and 2.

The RTPS Writers associated with Publishers and RTPS Reader associated with the Subscribers are reachable using RTPS locators. A RTPS locator is defined by a transport-kind, an address, and a port combination. For example, a possible locator for an UDPv4 transport would be (UDPv4, 10.10.100.1, 7400).

An RTPS Reader (associated with a Subscriber) may be reachable on multiple locators and a single locator (e.g. a multicast locator) may be used to reach multiple RTPS Readers.

Figure 10:
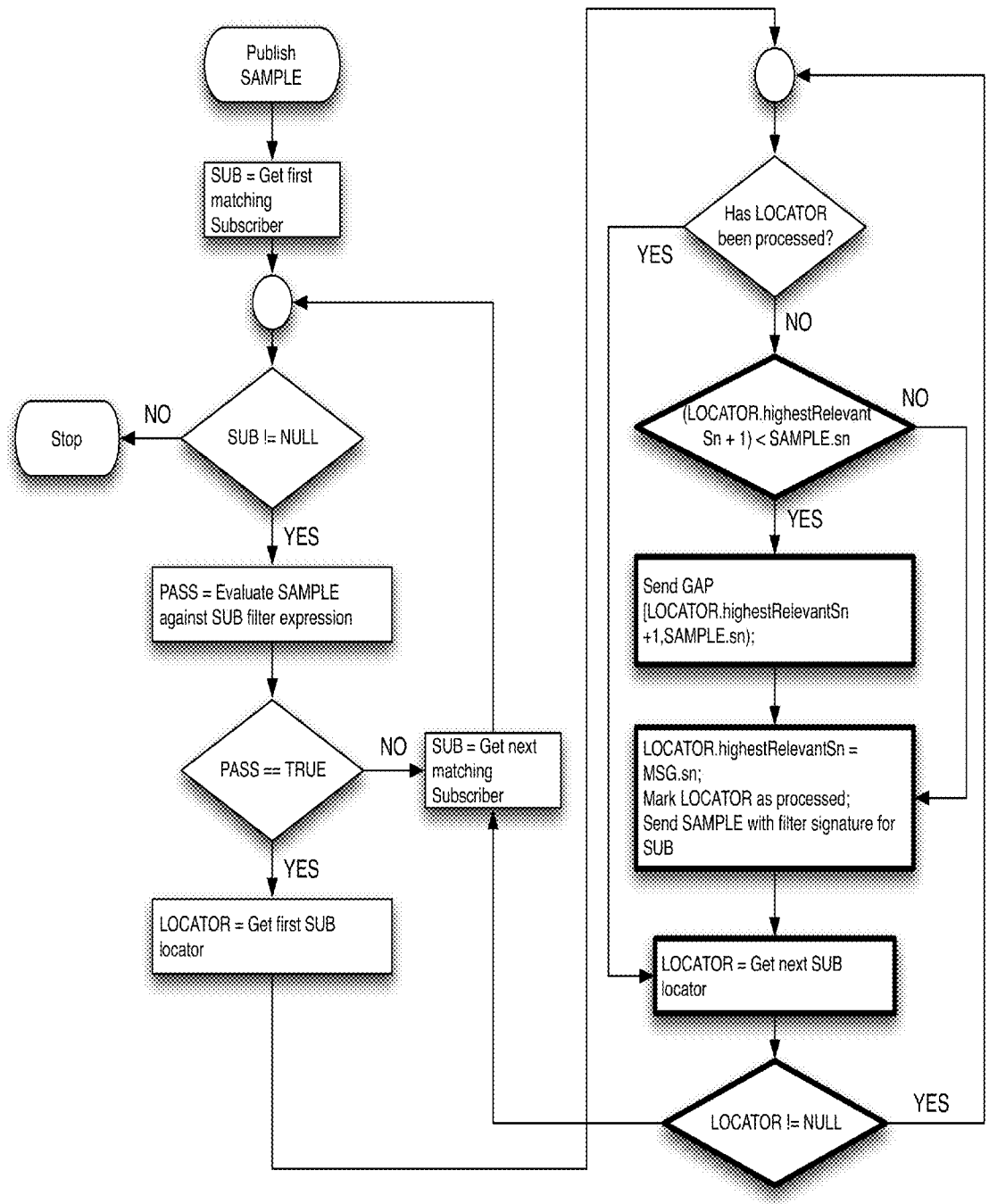
FIG. 10 shows an example of a lazy gapping computer-implementable algorithm according to an embodiment of the present invention.

To implement the lazy gapping algorithm previously described, the middleware must maintain some state per locator containing the last sequence number relevant (sent) to that locator. The implementation of the write (publish) operation is shown in FIG. 10.

It is noted that although the previous algorithm reduces the bandwidth required to send GAP messages it still has an order of complexity O(N) where N is the number of matching Subscribers. The CPU scalability problem on the Publisher will be addressed later in this document.

When a data-sample is sent to a locator, the Publisher can include an inline parameter with the RTPS DATA message containing the filter result. This inline parameter, called filter signature, is part of the RTPS specification. Its main goal is to avoid reader side filtering again the received message.

For the sake of simplicity the algorithm above does not address the case in which there are multiple Subscribers associated with a locator in the most efficient way. The inline parameter is only added for current Subscriber (SUB) when it should contain information about all the Subscribers associated with the locator.

Lazy Gapping with Reliable Communications

An RTPS Writer (associated with a Publisher) must periodically inform each matching reliable RTPS Reader (associated with a Subscriber) of the availability of samples by sending a periodic RTPS HEARTBEAT message that includes information about the sequence numbers of the available samples. If no samples are available, no HEARTBEAT message needs to be sent.

For reliable communication, the RTPS Writer must continue to send HEARTBEAT messages to an RTPS Reader until the Reader has either acknowledged receiving all available samples or has disappeared.

The RTPS HEARTBEAT message contains two sequence numbers: the lowest sequence number of all samples available to the Reader and the highest sequence number of all samples available to the Reader.

With lazy gapping, it does not make sense to announce the availability of samples to an RTPS Reader beyond the highest relevant sequence number for that Reader. Otherwise, the Reader would send RTPS ACKNACK messages requesting samples that have been filtered by the Writer but appear missing because no RTPS GAP message has been sent yet. This would cause unnecessary network traffic.

With the algorithm described in this invention the Writer sends RTPS HEARTBEAT messages to a Reader by setting the highest sequence number in the HEARTBEAT to the highest relevant sequence number for the Reader (maximum relevant sequence number across all the locators for the Reader).

CPU Usage Optimization on the Publisher

The publication algorithm shown in FIG. 10 has an order of complexity O(N) where N is the number of matching Subscribers.

Figure 11:
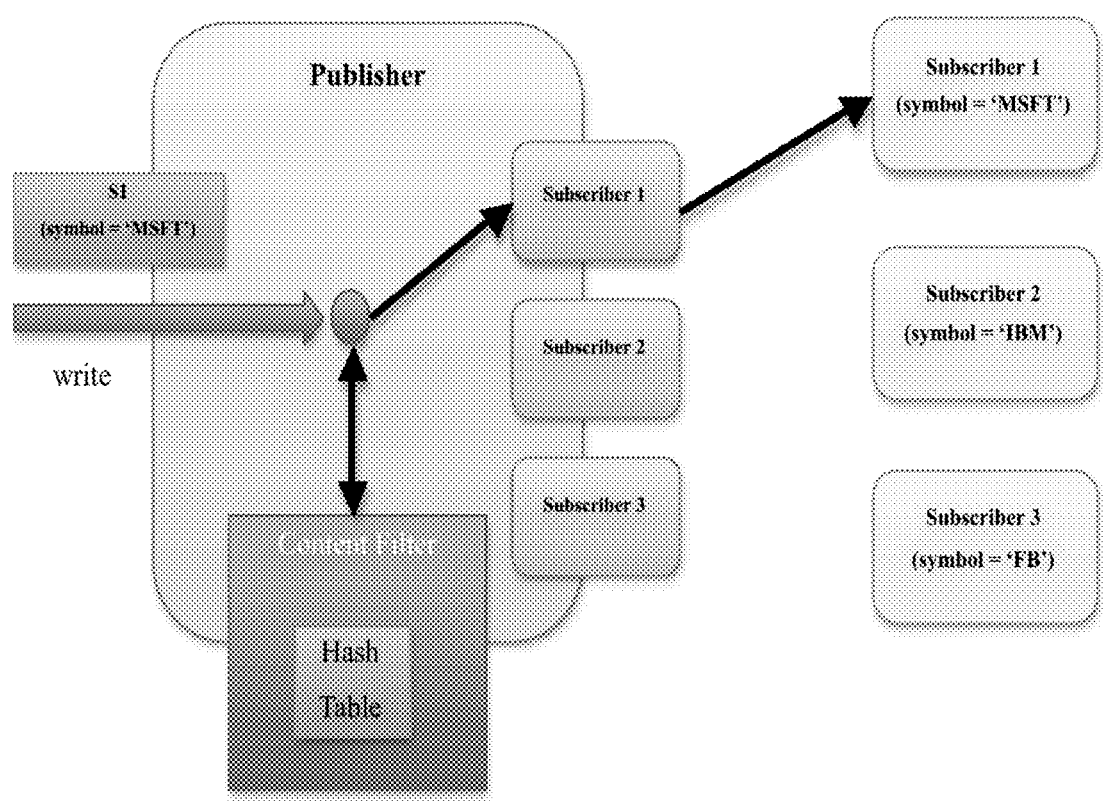
FIG. 11 shows an example of hash filtering according to an embodiment of the present invention.

The solution provided in the present invention enhances the order of complexity by creating a lookup table (e.g. a hash table) that associates an input sample 'S' to the list of Subscribers whose filter expression evaluates to PASS for the sample 'S' (FIG. 11). In one example, the order of complexity could go from O(N) to O(M) where M is the number of Subscribers that must receive the sample 'S'.

Figure 12:
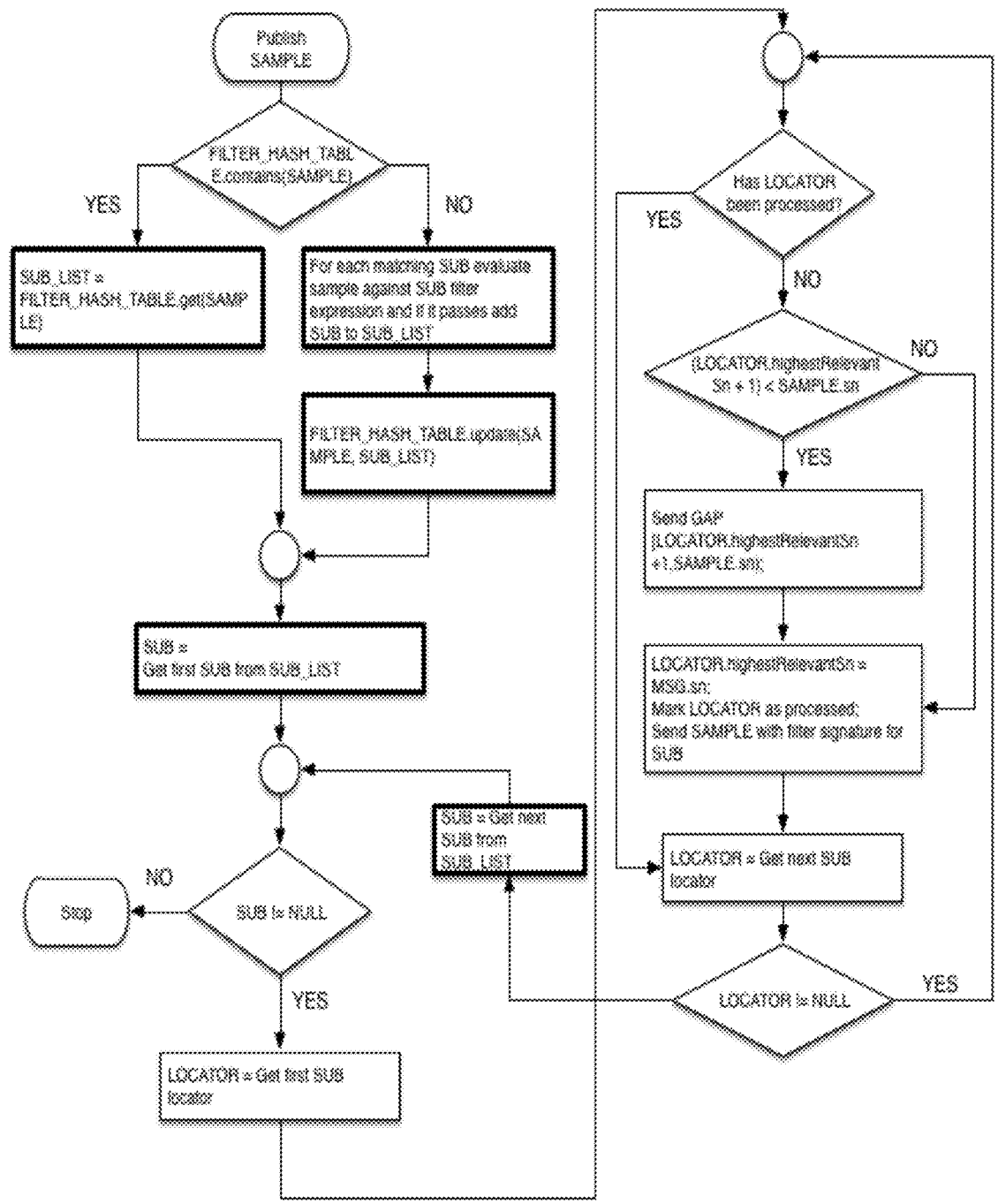
FIG. 12 shows an example of hash filtering publish algorithm combined with lazy gapping message distribution according to an embodiment of the present invention.

The implementation of the write (publish) operation with a lookup table is shown in FIG. 12.

The performance of the lookup operation depends on its implementation. Assuming a hash table implementation is used it would depend on two parameters:

The number of buckets on the hash table, and

The quality of the hash function.

To get close to the order of complexity O(M) (M being the number of subscribers) described before, it would be required that the lookup operation takes constant time, that is, it is an O(1) operation. This would require the information on each sample to end up in its own hash bucket. However, this may not be feasible in scenarios where the sample space is too big due to resource consumption.

Knowing some properties of the filters used by the Subscribers may help to get closer to the O(M) target without requiring so much memory.

For example, in the OMG Data Distribution Service specification, the Subscribers' filters could be based solely on key-only fields. In this case, the filter hash table could be a hash table with buckets for the instances (each instance corresponds to a different set of values for the key fields) versus a hash table with buckets for the samples. Because the instance space is smaller than the sample space, approaching an order of complexity O(M) would not be as demanding in terms of memory consumption.

Even if the goal of being able to lookup the filter result in a constant time is not achieved, it is often possible to create lookup tables that can take advantage of looking up previous results to reduce the time it takes to determine the Subscribers that are interested on a specific sample being published. Any of these algorithms could be used in combination with the present invention.

Results

Figure 13:
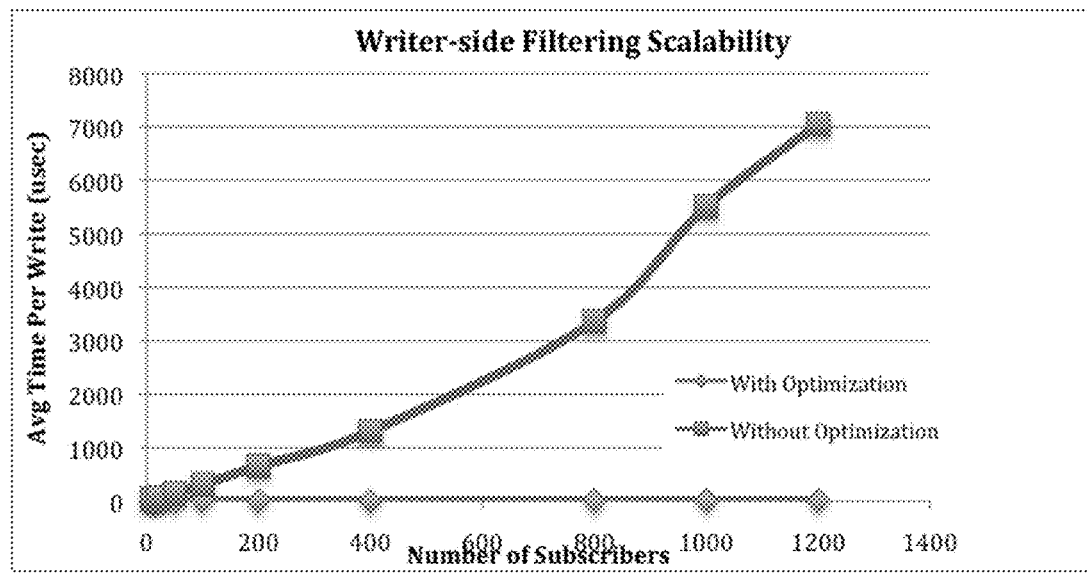
FIG. 13 shows an example according to an embodiment of the present invention the time that it takes to write a sample as we add more Subscribers using ContentFilteredTopics to the system. In this scenario, there is only one Subscriber that receives data. The data is filtered out for the other Subscribers.
Figure 14:
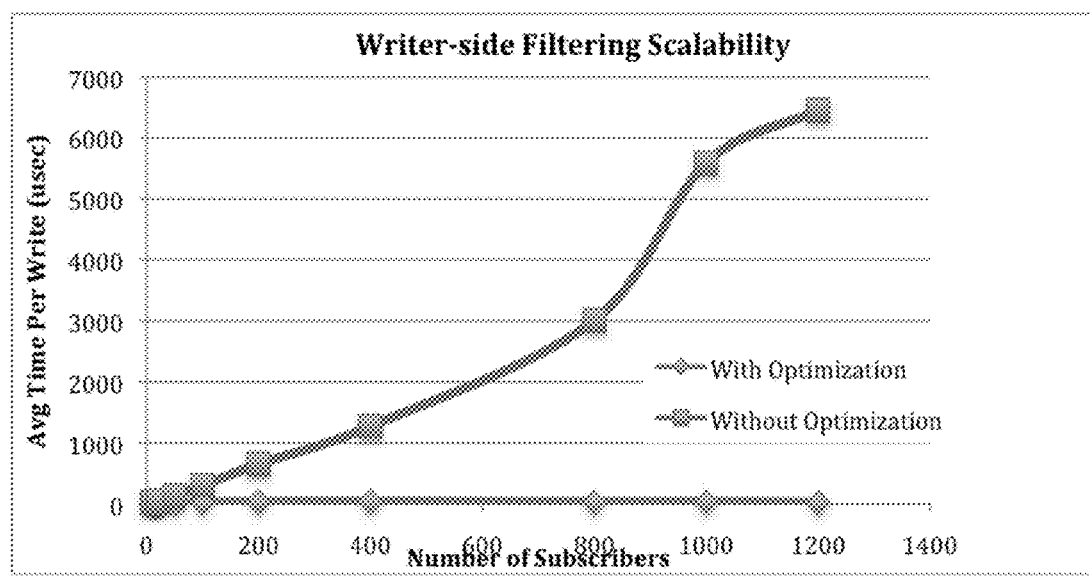
FIG. 14 shows an example according to an embodiment of the present invention the time that it takes to write a sample in a scenario in which the Subscribers receive samples in a round robin fashion.

The writer-side filtering optimizations described in the previous sections (lazy gapping and filter hashing based on key-only filters) have been incorporated into the RTI Connext DDS 5.0.0 release. FIG. 13 shows the time that it takes to write a sample as we add more Subscribers using ContentFilteredTopics to the system. In this scenario, each sample sent by the Publisher there is of interest to only one Subscriber. The data is filtered out by the content filters specified by the other Subscribers. FIG. 14 shows the time that it takes to write a sample in a scenario in which the Subscribers receive samples in a round robin fashion. As expected, in both cases the usage of the middleware version implementing the optimizations described in the present invention shows near-perfect scalability in terms of CPU consumption on the Publisher side.

Embodiments of the invention can be envisioned as computer-implemented methods executed by a computer either standalone or part of a system.

What is claimed is:

1. A method for performing writer-side content based filtering and data distribution from a publisher to a plurality of subscribers using an Object Management Group (OMG) Real-Time Publish-Subscribe (RTPS) protocol, the method comprising following computer-implemented method steps executable by one or more computers in a networked system:

(a) having the publisher and a plurality of subscribers being able to communicate with each other using the RTPS protocol, wherein each of the subscribers uses a content filter to subscribe to a subset of the information published by the publisher;

(b) having the subscriber reachable in one or more locators defined as a transport kind, a transport address, or a transport port combination;

(c) the publisher delaying sending of an RTPS GAP message to defined subscriber's locator until there is an RTPS DATA message with data that passes the subscriber's content filter;

(d) the publisher prepending the RTPS GAP message to the RTPS DATA message that is being sent to the subscriber locator;
(e) having the RTPS GAP message contain a sequence number interval starting in a sequence number of the last RTPS DATA message previously sent to the subscriber's locator and ending in a sequence number one less than the sequence number of the RTPS DATA message that is also being sent to the Subscriber's locator, following the RTPS GAP;
(f) iterating the steps (c) to (e) over all the defined locators on each of the subscribers with whom the publisher is communicating;
(g) having the publisher sending HEARTBEAT messages to a subscriber only when the subscriber is missing DATA messages that pass the subscriber's content-filter; and
(h) having the publisher sending HEARTBEAT messages to a subscriber where a highest sequence number in the HEARTBEAT is equal to a highest sequence number of the DATA messages that passed the subscriber's content-filter.

2. The method as set forth in claim 1, wherein the reachable locators are a TCP/IP or UDP/IP based transport.

3. The method as set forth in claim 1, wherein the reachable locators are based on a shared-memory based transport.

* * * * *